United States Patent [19]

Malinowski et al.

[11] Patent Number: 4,683,958
[45] Date of Patent: Aug. 4, 1987

[54] CULTIVATOR SHANK

[75] Inventors: Leon Malinowski; Kenneth Lange, both of Yorkton, Canada

[73] Assignee: Leon's Mfg. Co. Ltd., Saskatchewan, Canada

[21] Appl. No.: 746,161

[22] Filed: Jun. 17, 1985

[30] Foreign Application Priority Data

Mar. 8, 1985 [CA] Canada .................................. 476063

[51] Int. Cl.⁴ ............................................. A01B 23/02
[52] U.S. Cl. ..................................... 172/705; 172/708
[58] Field of Search ............... 172/708, 711, 707, 705, 172/643, 710, 765, 773, 264, 265, 266, 267

[56] References Cited

U.S. PATENT DOCUMENTS

| | | | |
|---|---|---|---|
| 111,852 | 2/1871 | Johnson | 172/732 X |
| 642,349 | 1/1900 | Martin | 172/711 |
| 1,290,446 | 1/1919 | White | 172/708 X |
| 4,047,823 | 9/1977 | Mydels | 172/708 |
| 4,453,602 | 6/1984 | Larsen | 172/707 |
| 4,534,418 | 8/1985 | Hegemann | 172/708 |

FOREIGN PATENT DOCUMENTS

| | | | |
|---|---|---|---|
| 225840 | 6/1958 | Australia | 172/705 |
| 123438 | 1/1910 | Canada . | |
| 158141 | 9/1914 | Canada . | |
| 1096686 | 3/1981 | Canada . | |
| 1107559 | 8/1981 | Canada . | |

Primary Examiner—Richard J. Johnson
Attorney, Agent, or Firm—Beveridge, DeGrandi & Weilacher

[57] ABSTRACT

A cultivator shank is adapted for mounting at one end on a cultivator frame and has an open C-shaped central section with its other end receiving a ground engaging tool. In between its ends, the shank tapers through a profile of changing sectional dimension so that its central section is deeper or thicker, in line with the direction of travel, than the dimension of the central section transverse to the direction of travel.

2 Claims, 5 Drawing Figures

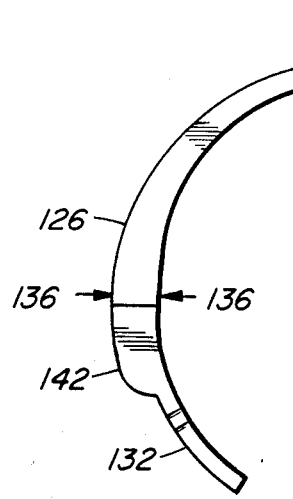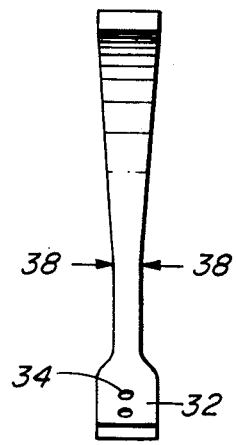
FIG. 3     FIG. 4
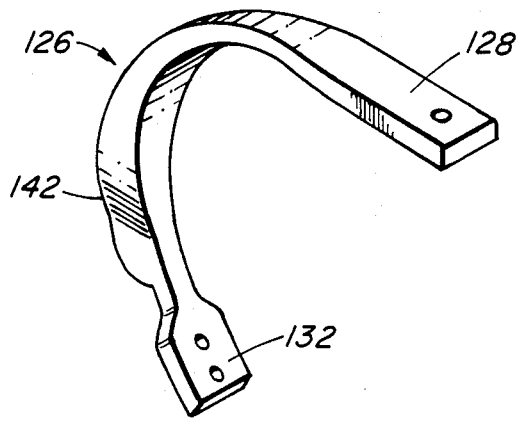
FIG. 5

CULTIVATOR SHANK

FIELD OF THE INVENTION

This invention relates to ground working tools of the type used on agricultural cultivators and in particular to an improved shank for connecting ground working tools to a cultivator frame.

BACKGROUND OF THE INVENTION

Conventionally, an agricultural cultivator consists of a frame and a plurality of ground engaging and working tools with some means to connect those tools to the frame. The connection is usually in the form of a spring release mechanism or mount, a shank which runs from the mount to the ground working tool and the tool itself, usually known as a sweep.

Normally, the shank consists of a section of spring steel which is formed to be part of the arc of a circle with flat sections at the top and bottom ends thereof, holes being provided in those ends to connect both the sweep and the mount on the cultivator frame.

This shank is usually rectangular in cross section with the wide dimension thereof set at right angles to the travel of the soil past the cultivator. Several cross sections have been decided on as being more or less standard in the industry. For example, for a field cultivator a shank could be 9/16" thick and 1¾" wide. For a chisel plow, the shank would be approximately 1" thick and 2" wide. Additionally, the ground engaging tools or sweeps have been standardized to fit this type of shank.

The pitch of the sweep while running through the soil has a substantial effect on the force or draft required to pull the unit while running. It has been found that a pitch angle of 0° to 2° requires the least draft. This of course means that the bottom of the sweep is running very close to the flat and is slicing easily through the soil. The greater the pitch angle, the more the tip of the sweep points downwardly. When this occurs, more surface of the sweep is exposed to the soil and this results in a greater amount of soil to move. Additionally, the tip moving downwards can encounter more compacted soil which also requires more force to cultivate. The result of these happenings is increased draft.

Those in the art will appreciate that the draft of an implement has a direct bearing on the size and horse power of the tractor required to pull it and this also has a direct result of more fuel consumed per acre worked. Therefore, a cultivator with less draft requires less power and less fuel to operate than one with higher draft. Preferably therefore a cultivator should be designed so that its sweep pitch in normal operation is as close to 0° as possible.

Numerous types of mounting mechanisms exist to attach a shank to a cultivator frame. These are designed to hold the sweep at a certain angle of attack and then release at a certain pressure if the sweep should strike a rock or other obstruction, so as to protect it and the shank against damage. However, the shank itself, due to its traditional, rectangular cross section and its construction, is, to some extent, flexible.

As the resistance or hardness of the soil increases on the sweep, a typical shank will "spring back". When this happens the pitch of the sweep increases to more of a "tip down" position resulting in more draft. Obviously, this also creates more resistance and the shank flexes back even further. Tests have shown that this "flexing back" of the shank itself can be up to 10° of pitch though around 5° to 6° is more typical.

SUMMARY OF THE INVENTION

It has been suggested that far less flexing would occur if a shank was mounted with its wide dimension in line with the direction of travel rather than at right angles to it. However, in such an arrangement, a conventional sweep or mounting plate would not fit such a shank. The present invention provides a shank which is conventionally shaped on the ends where the sweep and holders are mounted but changes in sectional dimension in its central area to provide a shank which has a much higher resistance to flexing back.

According to a broad aspect, the invention relates to a cultivator shank comprising a generally open C-shaped central body portion having one end for connection to a cultivator frame mount and another end for connection to a ground engaging tool. The shank, intermediate its ends, tapers through a profile of changing sectional dimension so that the central body portion of the shank is deeper in section in line with the direction of travel of the shank, than the width at the central body portion, transverse to the direction of travel of the shank.

A shank according to the present invention, in tests conducted by a Canadian university, results in approximately 20% less draft than a conventional shank in the same conditions. This is a substantial reduction in draft and is due to the increased rigidity of the shank according to the invention. Moreover, normal ground engaging tools and mounts can be used with the shank of the present invention.

Another benefit of the shank according to the invention is that it provides a narrower profile when viewed from its direction of travel so that surface residues such as straw, may more easily slip past the shank than a conventional device. This can result in less plugging of residue and also reduced draft.

The invention is illustrated by way of example in the accompanying drawings in which:

FIG. 3 is another elevation view of a further embodiment of a cultivator shank according to the present invention;

FIG. 4 is an end view of the shank shown in side view in FIGS. 2 and 3; and

FIG. 5 is a perspective view of a shank according to FIG. 3.

Figure 1:
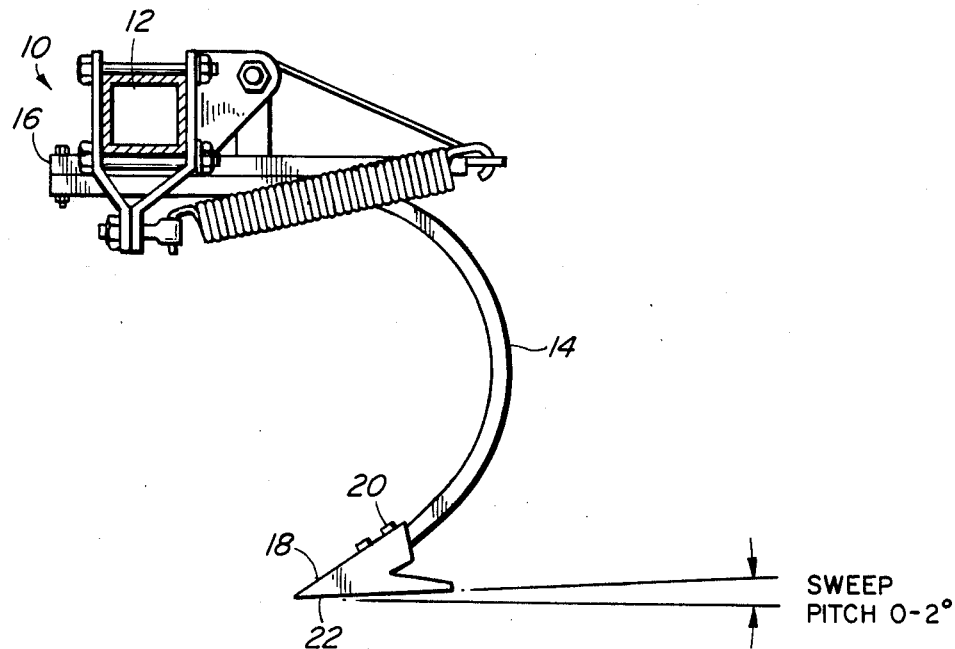
FIG. 1 is an elevation view of a typical, conventional shank installation.

Referring initially to FIG. 1 a conventional shank installation 10 comprises a cultivator frame mount 12 to which a shank 14 is secured as by a bolt/nut combination 16. Typically the shank 14 is a flat section of spring steel of generally constant thickness, the shank being rectangular in cross section with its wide dimension being set at right angles to the travel of the cultivator and of the soil therepast. The lower end of the shank is provided with a ground working tool in the form of a sweep 18 detachably secured by bolts 20 to the shank. As shown in FIG. 1, the sweep 18 has a pitch of approximately 0° to 2° so that the bottom surface 22 of the sweep runs very close to horizontal to slice easily through the soil.

Turning now to FIGS. 2-5, the cultivator shank 24 according to the invention has a generally open C- shaped central body portion 26 and has an upper end 28 for connection to a cultivator frame of the type shown in FIG. 1. To this end, end 28 is provided with an aperture 30. The other, lower end 32 is provided with drilled apertures 34 so as to receive a ground engaging tool such as a sweep of the type shown in FIG. 1. Intermediate its ends, the shank 24 tapers in two dimensions, width and depth, through a profile of changing sectional dimension so that the central body portion 26 is deeper in section, indicated by arrows 36 in FIG. 2, in line with the direction of travel of the shank, than the width of the central body portion as shown by the arrows 38 in FIG. 4, transverse to the direction of travel of the shank.

Figure 2:
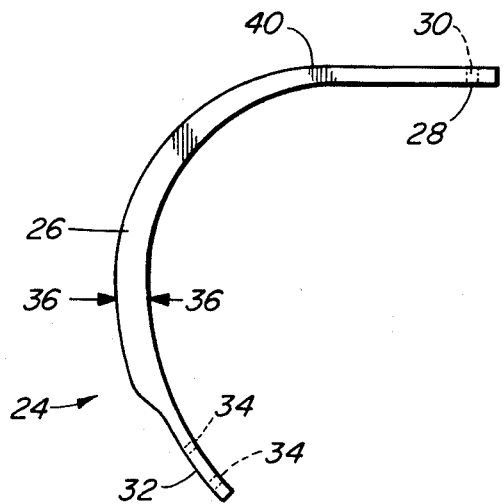
FIG. 2 is an elevation view of a cultivator shank according to the present invention.

In the embodiment of FIG. 2, the taper begins from the cultivator mount end 28 at approximately 0.40 and extends towards the tool mount end. In the FIG. 2 embodiment, the depth 36 becomes rather constant throughout a substantial portion of the length of the central body portion.

In the embodiment of FIGS. 3 and 4, the taper begins at approximately 140 and continues to increase in depth down to a heel area 142 so that, in this embodiment, the heel area 142 is somewhat thicker than that shown in FIG. 2.

It will be appreciated that numerous profile designs are possible within the scope of the present invention and that various features, characteristics and advantages of the present invention have been set forth in this disclosure and are readily realizable from the detailed description of the described embodiments. However, the disolosure is illustrative and various changes may be made while utilizing the principles of the present invention and following within the scope of the invention as defined in the appended claims.

The embodiments of the invention in which an exclusive property or privilege is claimed are defined as follows:

1. A spring steel cultivator shank of generally rectangular cross-section throughout its length comprising a one-piece generally open C-shaped central body portion having one end for connection to a cultivator frame mount and anther end for connection to a ground engaging tool;

said shank, intermediate said ends, changing in two cross-sectional dimensions from the cultivator mount end, which has a major cross-sectional dimension that is horizontal and at a right angle to the direction of travel, toward the tool mount end, which has a major cross-sectional dimension that is in the direction of travel, to provide a profile of changing cross-sectional area so that the central body portion is deeper in cross-section in line with the direction of travel of the shank than the width of the central body portion transverse to the direction of travel of the shank.

2. A cultivator shank according to claim 1, wherein the shank begins to taper inwardly in width adjacent the cultivator mount end and increase outwardly in thickness toward the central body poriton, said thickness reaching a maximum before terminating in a heel portion adjacent the tool mount end.

* * * * *